(12) United States Patent
Chiu et al.

(10) Patent No.: US 8,375,180 B2
(45) Date of Patent: *Feb. 12, 2013

(54) STORAGE APPLICATION PERFORMANCE MATCHING

(75) Inventors: Lawrence Y. Chiu, San Jose, CA (US);
Clement L. Dickey, San Jose, CA (US);
Yu-Cheng Hsu, Tucson, AZ (US);
Joseph S. Hyde, II, Tucson, AZ (US);
Paul H. Muench, San Jose, CA (US);
Cheng-Chung Song, Tucson, AZ (US)

(73) Assignee: International Business Machines Corporation, Armonk, NY (US)

( * ) Notice: Subject to any disclaimer, the term of this patent is extended or adjusted under 35 U.S.C. 154(b) by 512 days.

This patent is subject to a terminal disclaimer.

(21) Appl. No.: 12/700,964

(22) Filed: Feb. 5, 2010

(65) Prior Publication Data

US 2011/0197046 A1   Aug. 11, 2011

(51) Int. Cl.
*G06F 12/00* (2006.01)

(52) U.S. Cl. .. 711/156; 711/162; 711/165; 711/E12.002

(58) Field of Classification Search ........................ None
See application file for complete search history.

(56) References Cited

U.S. PATENT DOCUMENTS

| | | | |
|---|---|---|---|
| 6,622,221 B1 | 9/2003 | Zahavi | |
| 6,665,771 B1 | 12/2003 | Michel et al. | |
| 7,222,224 B2 | 5/2007 | Woo et al. | |
| 7,363,453 B1 | 4/2008 | Arnan et al. | |
| 2008/0016308 A1 | 1/2008 | Bartley et al. | |
| 2011/0078398 A1* | 3/2011 | Jess | 711/162 |

FOREIGN PATENT DOCUMENTS

JP         04-102947         4/1992

OTHER PUBLICATIONS

Mauro Andreolini, "Self-inspection mechanisms for the support of autonomic decisions in Internet-based systems," IEEE, Third International Conference on Autonomic and Autonomous Systems (ICAS 2007), 7 pages.

* cited by examiner

*Primary Examiner* — Charles Rones
*Assistant Examiner* — Baboucarr Faal
(74) *Attorney, Agent, or Firm* — Griffiths & Seaton PLLC (57) ABSTRACT

Input/output (I/O) activity in the multiple tier storage system is monitored to collect statistical information. The statistical information is recurrently transformed into an exponential moving average (EMA) of the I/O activity having a predefined smoothing factor. Data portions in the multiple tier storage system are sorted into buckets of varying temperatures corresponding to the EMA. At least one data migration plan is recurrently generated for matching the sorted data portions to at least one of an available plurality of storage device classes. One data portion sorted into a higher temperature bucket is matched with a higher performance storage device class of the available plurality of storage device classes than another data portion sorted into a lower temperature bucket.

14 Claims, 7 Drawing Sheets

STORAGE APPLICATION PERFORMANCE MATCHING

BACKGROUND OF THE INVENTION

1. Field of the Invention

The present invention relates in general to computers, and more particularly to a method, system, and computer program product for storage application performance matching in multiple tier computing storage environments.

2. Description of the Related Art

Computers and computer systems are found in a variety of settings in today's society. Computing environments and networks may be found at home, at work, at school, in government, and in other settings. Computing environments increasingly store data in one or more storage environments, which in many cases are remote from the local interface presented to a user.

These computing storage environments may use many storage devices such as disk drives, often working in concert, to store, retrieve, and update a large body of data, which may then be provided to a host computer requesting or sending the data. In some cases, a number of data storage subsystems are collectively managed as a single data storage system. These subsystems may be managed by host "sysplex" (system complex) configurations that combine several processing units or clusters of processing units. In this way, multi-tiered/multi-system computing environments, often including a variety of types of storage devices, may be used to organize and process large quantities of data.

SUMMARY OF THE INVENTION

Because a variety of interconnected devices and systems may be used to manage a particular body of data, it is beneficial to present to the user an organization of logically organized storage units (such as volumes) to which the user may assign storage. As a result, the user does not need the specific knowledge of the underlying physical storage device allocations to such logical units. Currently, a user of such "virtualized" multi-tiered computing environments must first, before storage activity on a particular storage unit takes place, configure the unit, such as a logical unit number (LUN), as part of a storage class (e.g., high/low latency or high/low capacity) by anticipating the workload of an owning application.

The user, however, is generally unaware of application and storage performance requirements previous to full system configuration and use, and further, is unaware how to dynamically optimize such storage units, for example, if new storage applications are used on an existing storage configuration. As a result, a need exists for a mechanism whereby the user is ensured accurate assignment of storage units into particular storage classes, and moreover, dynamic optimization of such configurations in the event of changes to the computing environment.

In view of the foregoing, various embodiments for matching storage application performance in a multiple tier storage system are disclosed. In one embodiment, by way of example only, a method for matching storage application performance in a multiple tier storage system is disclosed. Input/output (I/O) activity in the multiple tier storage system is monitored to collect statistical information. The statistical information is transformed into an exponential moving average (EMA) of the I/O activity having a predefined smoothing factor. Data portions in the multiple tier storage system are sorted into buckets of varying temperatures corresponding to the EMA. At least one data migration plan is recurrently generated for matching the sorted data portions to at least one of an available plurality of storage device classes. One data portion sorted into a higher temperature bucket is matched with a higher performance storage device class of the available plurality of storage device classes than another data portion sorted into a lower temperature bucket.

In addition to the foregoing exemplary embodiment, various system and computer program embodiments are provided and supply related advantages.

BRIEF DESCRIPTION OF THE DRAWINGS

In order that the advantages of the invention will be readily understood, a more particular description of the invention briefly described above will be rendered by reference to specific embodiments that are illustrated in the appended drawings. Understanding that these drawings depict only typical embodiments of the invention and are not therefore to be considered to be limiting of its scope, the invention will be described and explained with additional specificity and detail through the use of the accompanying drawings, in which.

DETAILED DESCRIPTION OF THE DRAWINGS

As one of ordinary skill in the art will appreciate, a variety of differing storage units are typically used in a particular situation. For example, solid state drives (SSD) typically have a much lower latency than a hard disk drive (HDD), but may also have a corresponding lower capacity. Further, tape devices may have an even higher latency than HDD devices, but may have the greatest storage capacity (or lowest cost per unit of storage). The differences between storage units classified into these exemplary classes (i.e., SSD, HDD, SATA, tape, etc.) are significant.

It is not uncommon that as the size of a body of stored data grows, the utilization efficiency of the data volume decreases. In other words, at any given time, only a small portion of the data is accessed actively, the small portion being subproportional to the data's size. As previously described, the user may not originally ascertain the correct storage configuration (e.g., the appropriate storage units in the appropriate classes) to match the capabilities of the storage system with the intended application workload. Moreover, the user may not have the knowledge to apply configuration changes to existing storage units to accommodate changes in workload or physical configurations (e.g., additional devices).

To address the various issues previously described, the illustrated embodiments below provide mechanisms for matching storage application performance with a variety of storage units organized into various storage classes. In addition, the illustrated embodiments provide for dynamic matching functionality, in that a user is able to apply configuration changes in the storage units to better accommodate changes in workload or physical configurations Inherent in the motivation behind various aspects of the present invention are the various advantages and disadvantages provided by the storage classes. For example, it is beneficial for application-affiliated data having the highest I/O activity to be associated with storage units having the lowest latency to improve performance. Similarly, it is beneficial for other data having lower I/O activity to be associated with storage units having a higher latency but perhaps lower cost.

As a result, by implementation of various aspects of the present invention, a user may realize a multiple-tier storage system that improves, for example, return on investment through optimal and intelligent use of differing storage tier characteristics. This may be accomplished, in one embodiment, by use of fine grain data placement and non-disruptive data migration based on the I/O activities in differing regions of the storage, and by taking advantage of characteristics of the various storage classes, such as use of SSD for higher input/output operations per second (IOPS) and lower latency characteristics, and use of devices such as HDD and tape for higher capacity storage.

The illustrated embodiments dynamically identify new "hot spots" and "cold spots" in the storage system according to a changing application workload. Storage system performance is monitored to adapt a fine grain (i.e., small unit of data based) data placement mechanism to an appropriate storage device class. Based on I/O statistics collected from such storage system monitoring, a fine grain, non-disruptive storage migration plan is generated, and later, executed. Accordingly, pursuant to this functionality, a user need not configure a storage unit (such as a LUN) to the appropriate device class prior to executing an owning application. Moreover, the storage system is capable of dynamically adjusting the fine grain data placement according to a changing workload from one or more owning applications, or in response to a configuration change within the storage system.

Figure 1:
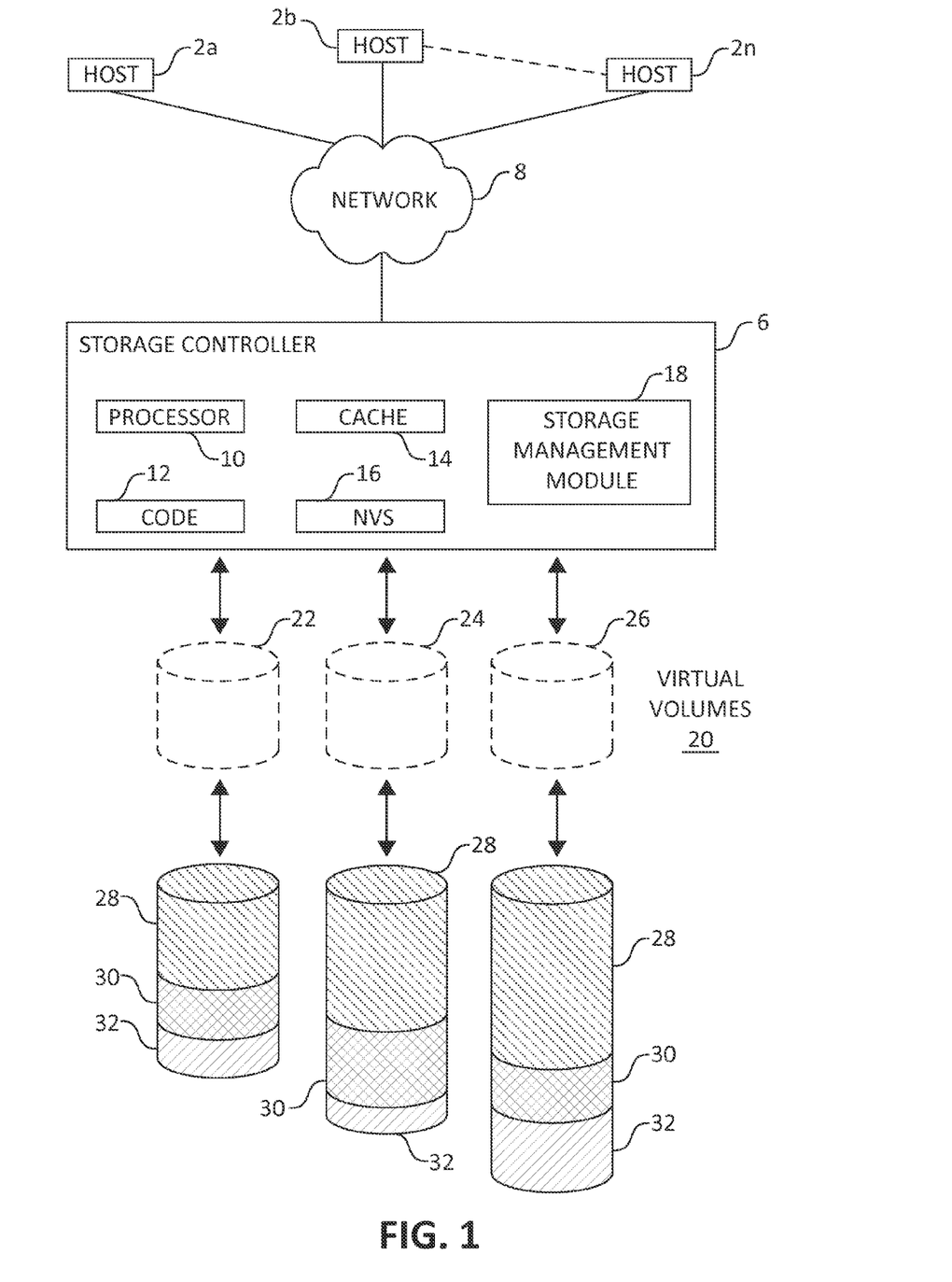
FIG. 1 is a block diagram illustrating an exemplary multi-tiered data storage computing environment which may implement aspects of the present invention.

In the following description, reference is made to the accompanying drawings which form a part hereof and which illustrate several embodiments of the present invention. It is understood that other embodiments may be utilized and structural and operational changes may be made without departing from the scope of the present invention. FIG. 1 illustrates a computing storage environment in which aspects of the invention may be implemented. A plurality of host systems $2a, b \ldots n$ transmit Input/Output (I/O) requests to one or more storage volumes 28, 30, and 32 through a storage controller 6 which manages access to the storage volumes 28, 30, and 32. In certain implementations, the storage volumes may be physically comprised of a plurality of hard disk drives organized as Just a Bunch of disks (JBOD), a RAID array, Direct Access Storage Devices (DASD), SSD, tape devices, etc.

A number of virtual volumes 22, 24, and 26 are presented to the host systems $2a, b \ldots n$ in lieu of presenting a number of physical or logical volumes (often which may be physically configured in a complex relationship). The host systems $2a, b \ldots n$ may communicate with the storage controller 6 over a network 8, such as the Internet, a Storage Area Network (SAN), an Intranet, Local Area Network (LAN), Wide Area Network (WAN), etc., using multiple communication protocols such as TCP/IP, Fibre Channel, Ethernet, etc. at different layers in a protocol stack.

The storage controller 6 includes a processor 10 executing code 12 to perform storage controller operations. The storage controller 6 further includes a cache 14 and non-volatile storage unit 16, such as a battery backed-up memory device. The storage controller 6 stores in cache 14 data updates received from the hosts $2a, b \ldots n$ to write to the virtual storage volumes 22, 24, and 26 (and thereby to volumes 28, 30, and 32) as well as data read from the volumes 28, 30, and 32 to return to the hosts $2a, b \ldots n$. When operating in Fast Write mode, data updates received from the hosts $2a, b \ldots n$ are copied to both cache 14 and the NVS 16. End status is returned to the host $2a, b \ldots n$ sending the data update after the update is copied to both the cache 14 and NVS 16.

FIG. 1, as one of ordinary skill in the art will appreciate, may illustrate a portion of a larger, multi-system/multi-cluster storage environment having a number of interrelated components such as the previously illustrated storage controller 6. As previously indicated, while virtual volumes 22, 24, and 26 are presented to the user via the host systems $2a, b \ldots n$, the underlying physical configuration may take many possible forms. For example, a number of interrelated storage devices in various classes, such as SSD, SATA, HDD, tape, etc. may comprise the storage volumes 28, 30, and 32 depending on a particular configuration.

Various components of the storage environment, such as processor 10, may be adapted to implement aspects of the present invention and following claimed subject matter. For example, a storage management module 18 may operate in conjunction with processor 10 to perform various functionality to be further described, such as monitoring I/O activity, transforming the I/O activity to an analyzable representation, creation of a data migration plan, and finally, execution of this plan. One of ordinary skill in the art will appreciate that other various data processing and memory components may be implemented to realize these aspects, and may be operational on the storage controller 6, or elsewhere. Storage management module 18 may further comprise a variety of additional modules as will be further described to implement various portions of functionality. For example, in one embodiment, the storage manager module 18 may further comprise an I/O monitor module, data placement advisor module, data migration planner module, and data migrator module as will be further described with reference to FIG. 2, following.

Figure 2:
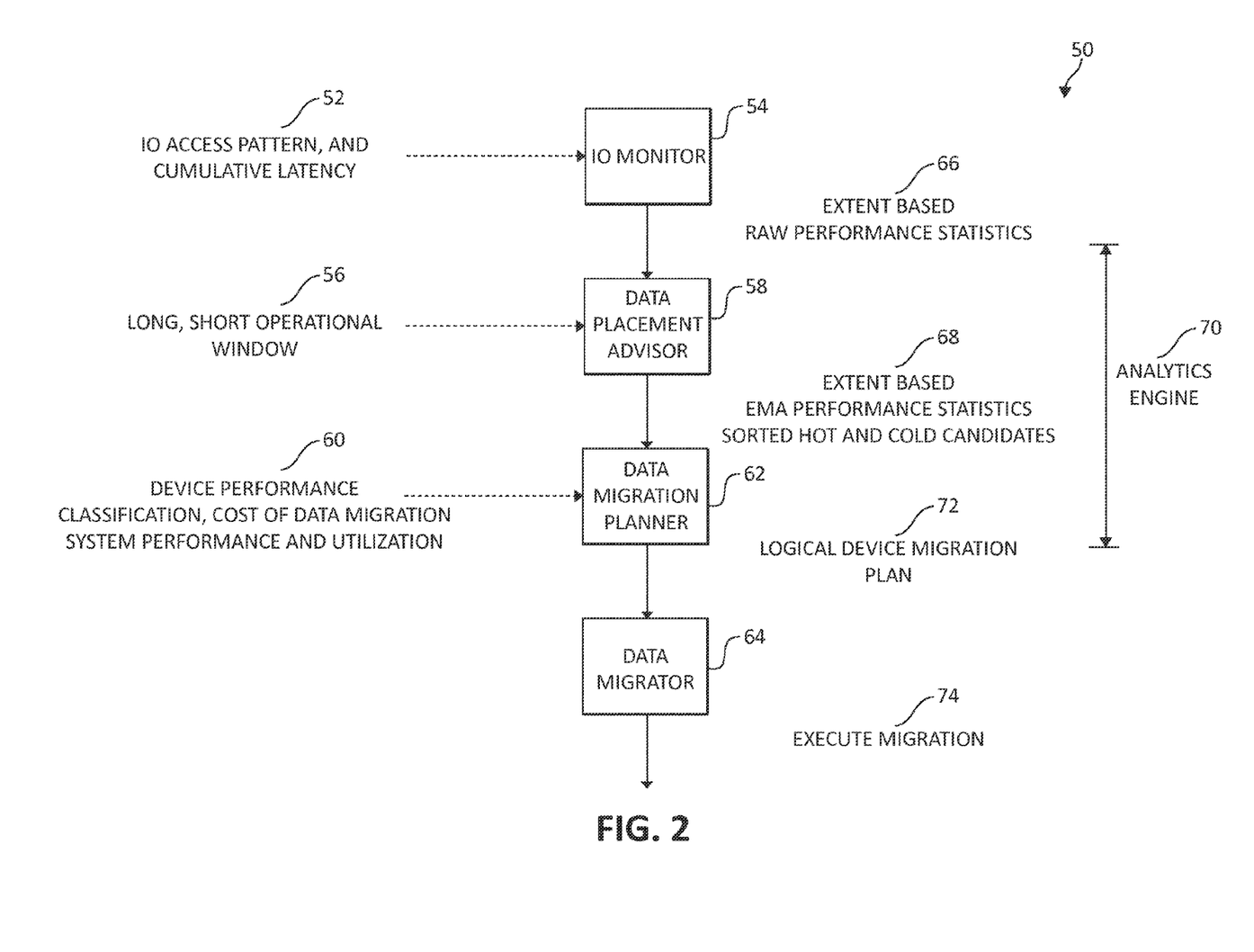
FIG. 2 is a block diagram of various blocks of functionality provided by aspects of the present invention.

Turning now to FIG. 2, a block diagram of various functional aspects of the present invention are depicted as an exemplary flow. As previously described, I/O performance statistics of a logical, non-overlapping unit of storage are collected and recorded for every I/O operation. Such logical non-overlapping unit of storage may be a logical block device, a subdivision within a logical block device, a file, a subdivision within a logical file, a database table space, or database objects. In every fixed duration, a set of performance data is shapshot. This performance data may include such information as an I/O access pattern (e.g., read/write counters, I/O counters, etc.) and cumulative latency characteristics 52, as well as a cache miss count, total data transferred, and an average I/O size, for example. In one embodiment, an I/O monitor module 54 gathers such performance data. In today's multi-system storage environments, one of ordinary skill in the art will appreciate that the number of logical storage units monitored may range in the millions to hundreds of millions of units.

Following the collection of the aforementioned performance data, the "raw" performance data is digested and transformed to performance trend data kept in the form of moving averages (including predefined smoothing factors corresponding to each moving average), as will be further described. The digested form helps to reduce metadata storage and allows for significantly more historical data to be retained. In addition, the transformed data may be used to determine which of short-term or long-term performance demands of the storage system should be first addressed.

Figure 3A:
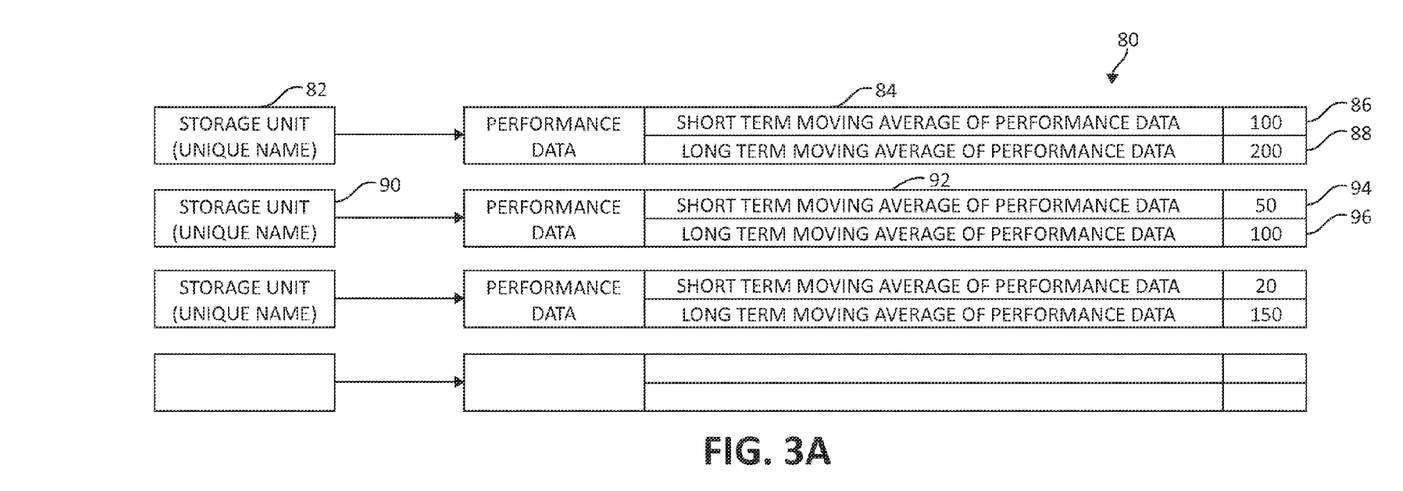
FIG. 3A is a block diagram of an illustration of transforming statistical I/O data into exponential moving average (EMA) information for the statistical data.
Figure 3B:
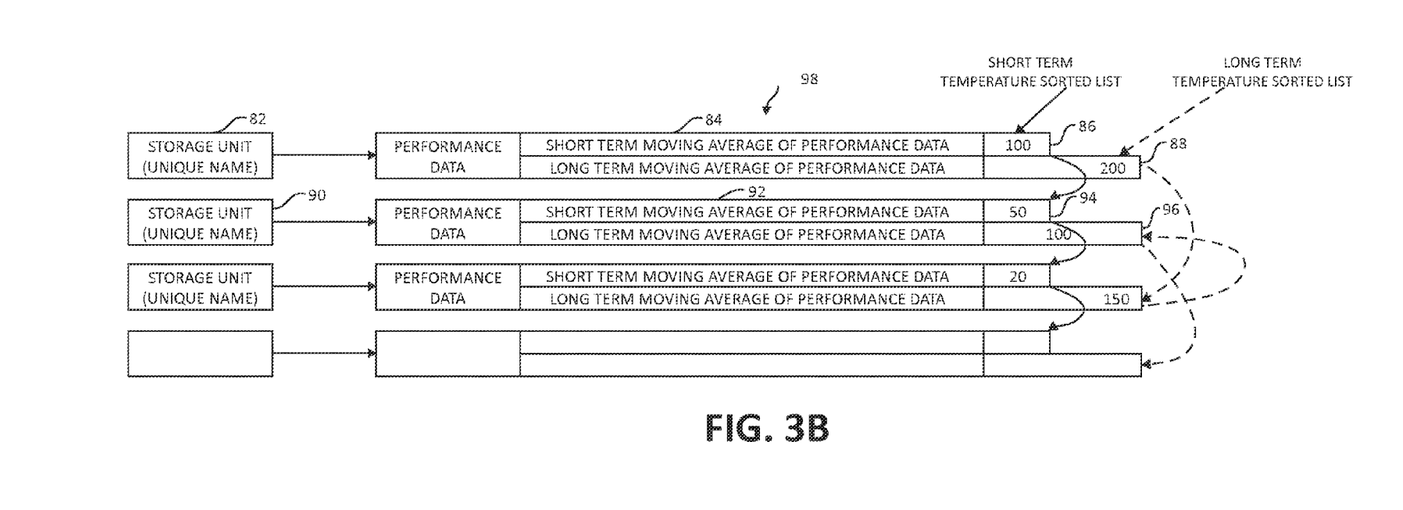
FIG. 3B is a block diagram of an exemplary process of temperature sorting EMA information for the various storage units first depicted in FIG. 3A.

In one exemplary embodiment, a data placement advisor module 58 collects 300 data samples in one day, and collects 2000-2100 data samples in one week (e.g, the long, short inputs 56 as shown). The collection of a certain number of samples per a predefined interval may vary according to a particular implementation, as one of ordinary skill in the art will appreciate. In this context, 300 samples may be used to generate short term moving average data, and 2000 samples may be used to generate long term moving average data. This transformation is further described in FIGS. 3A and 3B, following, where in FIG. 3A, for example, a collection 80 of short and long term moving average transformations (e.g., 84, 92) of performance data are represented for a number of storage units. In one example, the I/O activity of storage unit 82 is transformed into a short term moving average value 86 and a long term moving average value 88. Similarly, I/O activity of storage unit 90 is transformed into short term moving average value 94 and a long term moving average value 96.

The moving averages may be used in sorting and ranking the performance of different logical units of storage. By doing so, data placement analysis will identify "hot spot" and "cold spot" candidates of different storage tiers, classes or pools. Hot spot candidates may be thought of as logical units of storage where an owning application demands a higher I/O performance capacity, while cold spot candidates are the opposite. These candidates may be sorted and are passed to the next phase to evaluate cost-benefit considerations of possible data placement and/or data migration. In the example sorted lists 98 depicted in FIG. 3B, following, two sorted lists are illustrated (such as devices 82 and 90).

Figure 4A:
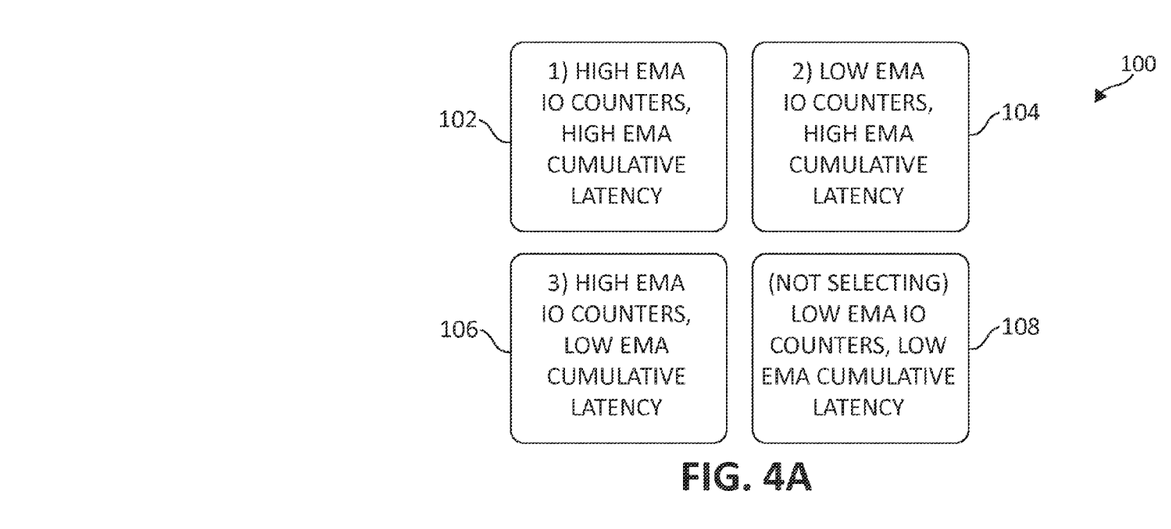
FIG. 4A is a block diagram of an exemplary sorting process of EMA and latency information.
Figure 4B:
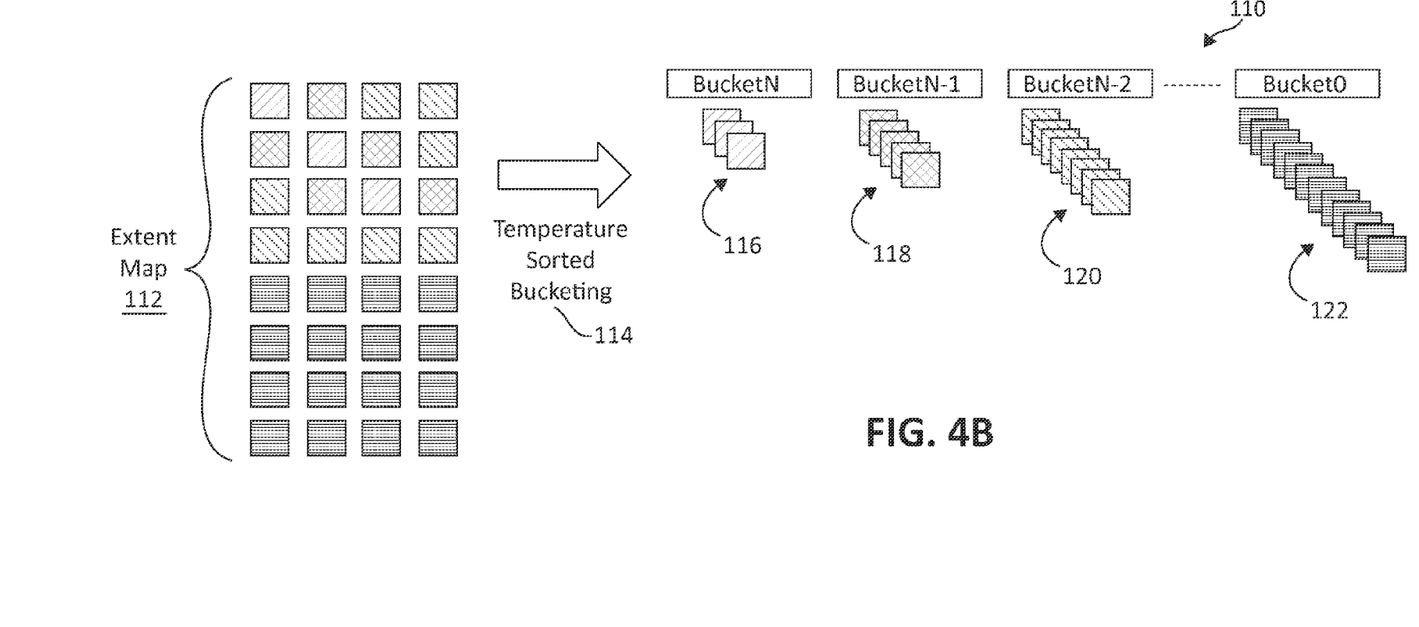
FIG. 4B pictorially illustrates the sorting process first depicted in FIG. 4A of a number of storage extents temperature sorted into various extent buckets according to the present invention.

Turning next to FIGS. 4A and 4B, the functionality of data transformation into exponential moving averages and subsequent temperature sorting are further depicted in block diagram form in one exemplary embodiment. In FIG. 4A, an exemplary set of temperature-specific classifications 100 is depicted. In the depicted example, a "hot" set of I/O statistics is classified in category 102. Category 102 features data having higher calculated EMA values based on I/O counters, and higher EMA values based on cumulative latency. In other words the data represented in classification 102 has high short term and long term EMA values. A less hot set of I/O statistics is classified in category 104, where data having lower I/O counter-based EMA values, yet higher cumulative latency-based EMA values is placed. A still less hot set of I/O statistics is classified in category 106, where data having higher I/O counter-based EMA values yet lower cumulative latency-based EMA values is placed. Finally, that data having low I/O counter-based EMA values and lower cumulative latency-based EMA values is placed into category 108 as the coldest classification. Each EMA transformation of relevant I/O statistics is characterized by a predetermined smoothing factor corresponding to the particular EMA. One of ordinary skill in the art will appreciate that the exemplary temperature-specific classifications as shown in FIG. 4A may be tailored for migration between various storage devices, and may vary for a particular implementation.

An exemplary depiction of such temperature sorting (based on the four temperature classifications seen previously in FIG. 4A) is shown in FIG. 4B, following. As shown, a number of extents, or contiguous portions of data blocks, are placed in an extent map 112. Pursuant to temperature sorted bucketing 114, each of the extents in the extent map 112 are sorted into one of a number of buckets corresponding to a particular temperature. As shown, the hottest extents are sorted into bucket 116, while less hot extents are sorted into bucket 118, 120, and so on, until bucket 122 is filled with the remaining extents from the extent map 112. As one of ordinary skill in the art will appreciate, a varying number of buckets may be designated corresponding to certain specific temperature characteristics.

Returning to FIG. 2, the temperature sorting functionality exemplified in FIG. 4B is represented, where an analytics engine 70 (in the depicted embodiment) is responsible for transforming the extent-based raw performance statistics 66 into extent-based EMA performance statistics (including a predefined smoothing factor corresponding to each EMA), which are then sorted into hot and cold candidates 68 as previously described.

As a following step in the depicted flow of FIG. 2, a data migration planner module 62 performs data migration planning functionality as will be now described, for example, by taking considerations of device performance, classification, cost(s) of data migration, system performance, and utilization 60 into account. These considerations are utilized to generate a logical device migration plan 72 as will be further described. The logical device migration plan 72 provides guidance to storage system management (be it user controlled or implemented pursuant to a storage management application). The storage system then may take steps to execute data migration in accordance with some or all of the recommendations of the logical device migration plan, with a non-disruptive view.

Figure 5:
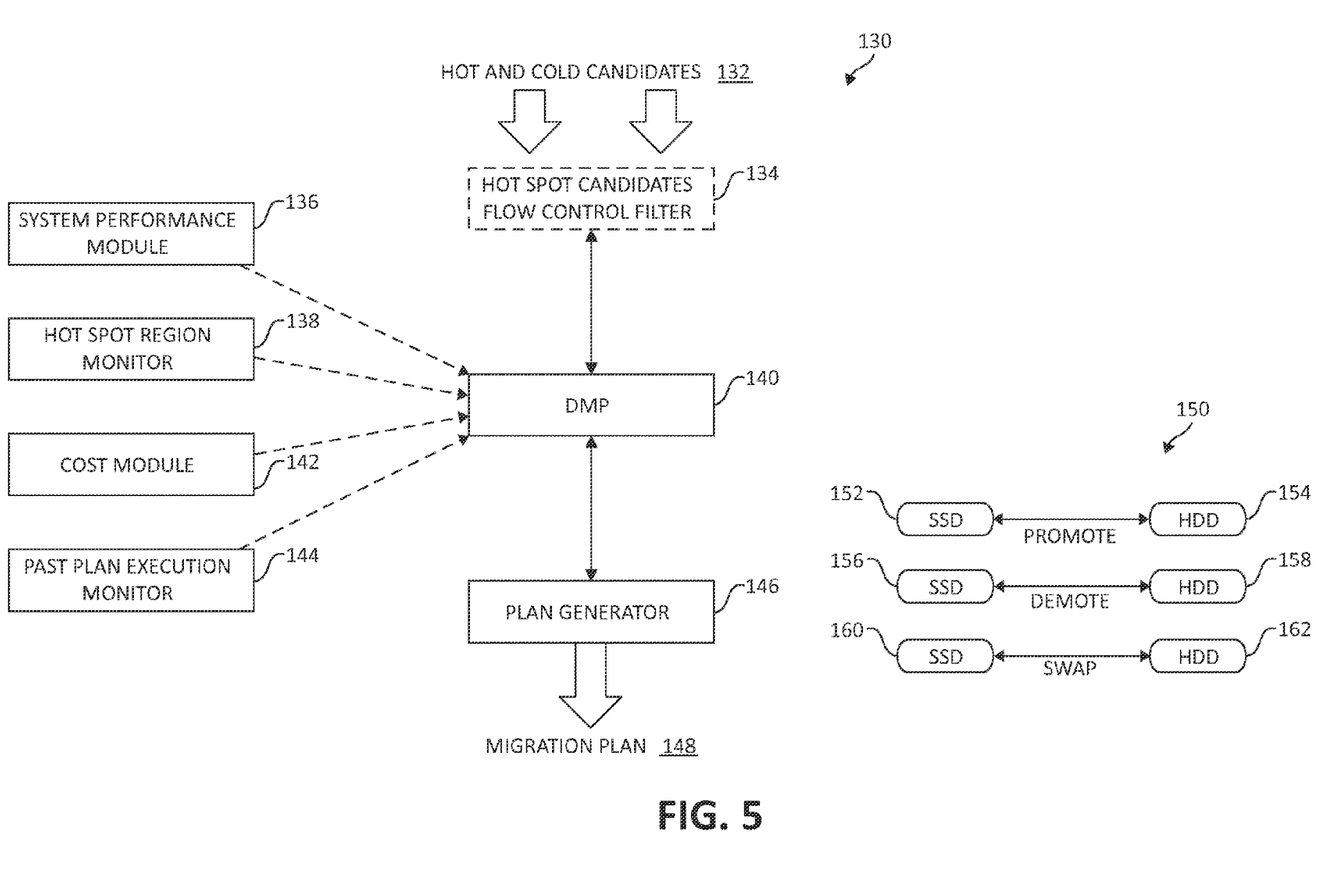
FIG. 5 is a block diagram of an exemplary process of initializing, calculating, and generating a data migration plan.

FIG. 5, following, illustrates various blocks of functionality for performing data migration planning 130 in an exemplary flow. As a beginning step, each of the hot and cold candidates 132 (which again can vary according to the number of buckets initialized) are placed into a flow control filter module 134 for processing. The data migration planner (DMP) module 140 then takes various factors/considerations into account, such as data originating from various system monitoring modules. These modules are depicted as system performance monitor, hot spot region monitor, cost model, and past plan execution monitor modules 136, 138, 142, and 144, and provide various statistical information to the DMP module 140. While an amount or priority of the statistical information may vary, the depicted embodiment shows information stemming from monitoring of system performance, determinations of regions of varying temperatures, cost model(s), and historical information as inputs to the DMP module 140.

DMP module 140 analyzes the various inputs as previously described, providing them to a plan generator module 146 for generation of a migration plan 148 as will be further described. In one embodiment, the migration plan may include any or all of the steps 150 depicted in FIG. 5, such as promoting data currently associated with one or more HDD devices 154 to regions of one or more SSD devices 152, demoting data currently associated with one or more SSD devices 156 to be associated with one or more HDD devices 158, and finally, swapping data currently associated with one or more SSD devices 160 with data currently associated with one or more HDD devices 162.

Figure 6:
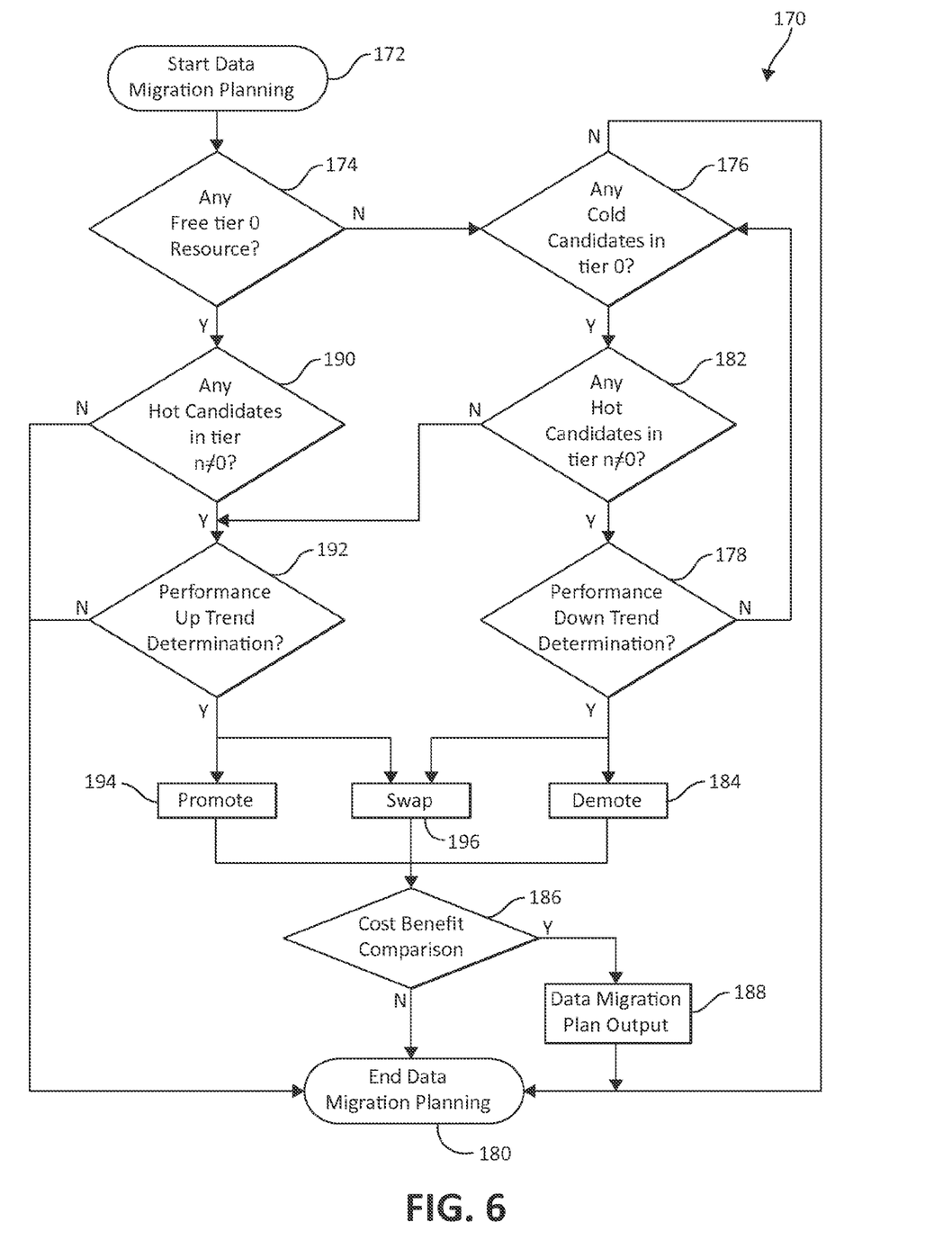
FIG. 6 is a flow chart diagram of an exemplary execution of a data migration plan.

FIG. 6, following, is a flow chart diagram of exemplary data migration planning 170 that may be implemented according to aspects of the present invention. During such data migration planning, the DMP module uses (in the illustrated embodiment) the following decision logic to determine how to generate a migration plan to move data among and between a fastest tier (tier 0) and a number of slower tiers (tier n). To start such planning (step 172), the DMP module first determines if there is free available space in tier 0 (step 174). If so, the method 170 moves to step 190, where the method prepares for data promotion pursuant to the data migration plan. If no, the method 170 then moves to step 176, where the method begins to make further determinations as to whether to demote or swap data as will be further described.

Returning to step 190, the method 170 determines if there are any hot data candidates in the temperature-sorted moving average list in tier n. The head of the list represents the hottest data within the corresponding tier n. Pursuant to this determination, the hot candidates are tested to determine whether their performance trending is increasing (step 192). To make this determination, the method 170 compares the short term moving averages to the long term moving averages. If the short term moving averages is larger or equal to the long term moving averages, then the particular hot candidate is determined to be on an "up" trend, and the method 170 moves to either step 194 or step 196. Otherwise, the candidate is not determined to be on an up trend, and the method 170 exits the current considerations for the particular candidate and returns to step 190 to look for additional hot candidates having an up trend.

Returning to steps 194 and 196, the method 174 (depending on various determinations of the DMP), begins to prepare to generate a promoting data migration plan for the hot candidate on tier n. For example, the DMP may determine whether the migration cost of this particular hot candidate is justified by determining whether the projected performance gain of the hot data candidate resulting on the tier 0 will be larger than the cost migration. The projected performance can be determined by using the current performance profile and modeled if the same workload applied to the tier 0. Hence the projected performance gain is equal to current performance minus the project performance. The cost of migration can be calculated a priori in terms of I/O count and total latency.

If the projected performance gain is a net gain pursuant to the aforementioned cost/benefit comparison (step 186), the promoting data migration plan is generated for the selected hot candidate (step 188). If the data suggest pursuant to the cost benefit comparison in block 186 that such a net gain is not clearly satisfied, then the hot candidate may be a better candidate for swap functionality according to block 196, and again pursuant to these determinations, the swapping data migration plan output is generated for the selected candidate (again, step 188).

Returning to step 176, the method 170 determines if any cold data candidates are found in the temperature-sorted moving average list in tier 0. In one embodiment, the tail of the list represents the coldest data within the corresponding tier 0. The cold data candidate will be tested as to whether the performance trending is down. To determine whether the performance trend is down for the selected cold candidate, the method 170 again compares the short term moving averages to the long moving averages (step 178). If the short term moving average is smaller or equal to the long term moving average, then the candidate is trending down, and the method 178 moves to step 184. Otherwise, the candidate is not on the down trend, and the method 170 exits analysis for the selected candidate and returns to step 176 to identify additional cold candidates with a down trend. If no additional cold candidates are found, the method 170 ends (step 180).

Returning to step 182, a determination is made whether any hot data candidates are found in the temperature-sorted moving average list in tier n. In one embodiment, the head of the list represents the hottest data within the corresponding tier n. This candidate will be tested as to whether performance trending is up (again, step 192). Here again, to determine whether the performance trending is increasing, the short term moving average is compared against the long term moving average. If the short term moving average is larger or equal to the long term moving average, the candidate is on an up trend, and the method moves to either step 194 and 196 as previously described. Alternatively, the candidate (again now for tier n) is not on an increasing trend, and the method 170 exists the current analysis and returns back to step 190 to look for additional lower-tiered data candidates.

If no additional hot candidates are found for the particular tier, then the method 170 moves from step 182 to step 192, where it prepares to generate a swapping data migration plan for the hot data candidate on tier n, and the cold data candidate on tier 0. Pursuant to this determination the method 170 again conducts cost/benefit comparisons in block 186 described previously, such as determinations as to whether the swap migration cost of the selected hot data candidate and cold data candidate is justified. This may be performed by calculating whether the projected performance gain of the hot data candidate resulting on the tier 0 minus the projected performance loss of cold data candidate result on the tier n will be larger than the cost of migration. The projected performance can be determined by using the current performance profile and modeled if the same workload applied to the tier 0 or tier n. Hence the projected performance gain is equal to current performance minus the project performance. To obtain comparable units, the performance gain is multiplied by a time, such as the expected time in tier 0. The cost of migration can be calculated a priori in terms of I/O count and total latency.

Following generation of various migration plans for selected hot/cold candidates, a number of exemplary steps may be taken to implement promoting, swapping, and/or demoting functionality as previously described. For example, pursuant to implementing a promoting data migration plan, a free storage resource may first be allocated in the target tier. The source of the migration is then read to a data buffer. Next, the buffer is written to the free storage resource. Finally, the resource containing the source of data migration is deallocated.

Similar steps may be taken in implementing a swapping data migration. First, a free resource is allocated in a source hot tier. Next, the source of the cold candidate is read to a data buffer. The buffer is written to the free resource. A vacant resource of the cold candidate is reserved. The source of the hot candidate is read to the data buffer, the buffer is then written to the vacant resource, and finally, the resource originally containing the hot candidate is deallocated.

Here again, similar steps may be taken in a demoting data migration. A free resource is first allocated, and the source of migration is read to a data buffer. The buffer is written to the free resource, and the resource originally containing the source of migration is deallocated. As one of ordinary skill in the art will appreciate, each of the various steps described above may be varied according to a particular implementation. Furthermore, the steps may be repeated for each of the hot and cold candidates on varying tiers until none are remaining.

In one embodiment, a data migrator (DM) module executes the recommend migration plan. The DM provides necessary serialization and resource allocation support to manage the data migration integrity. In this sense, the migration plan is a suggestion, where no resource is allocated or no serialization of broader system activities is considered. The DM may be adapted to throttle the amount of data migration bandwidth, and observe system limitations, as the migration plan is executed.

Figure 7:
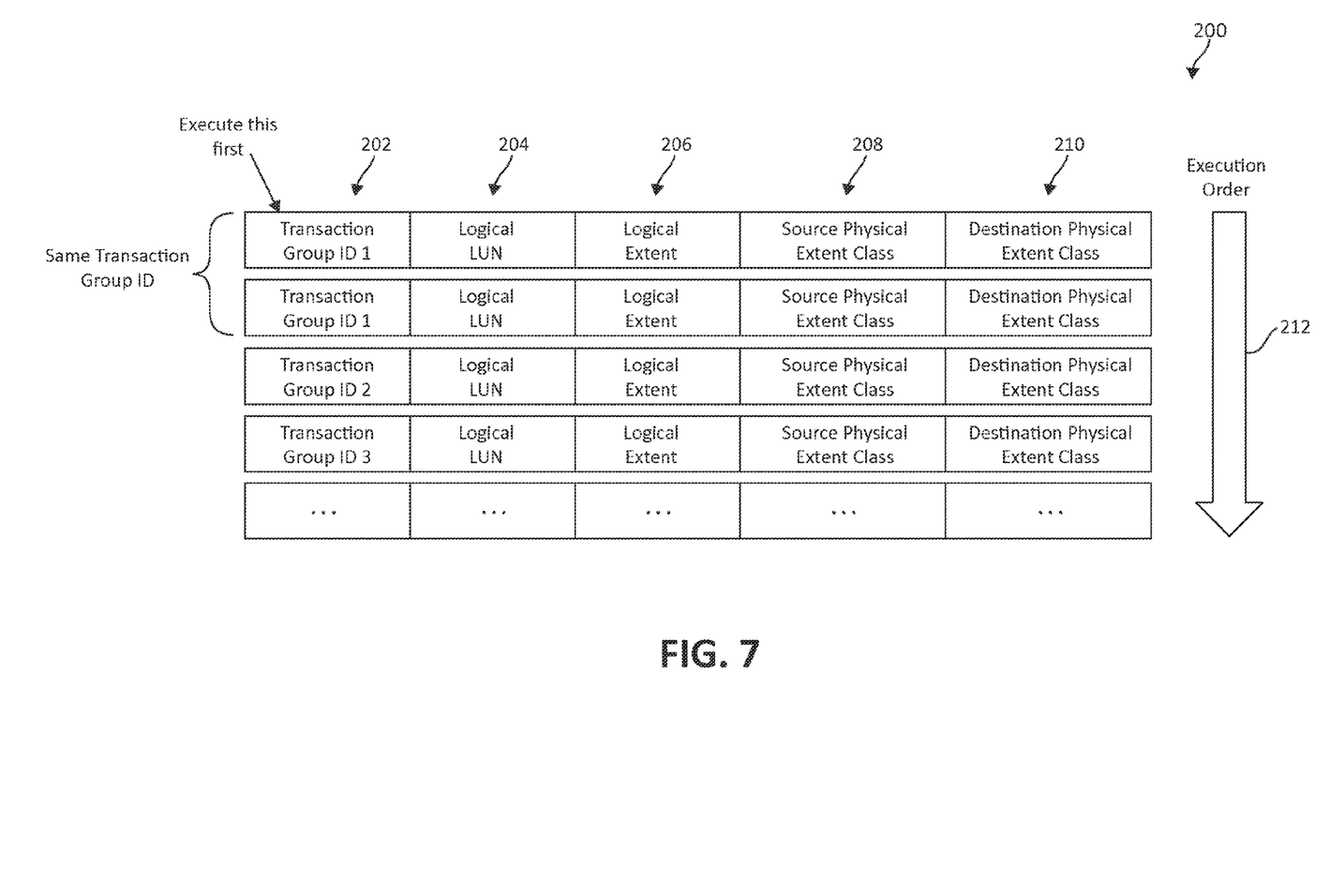
FIG. 7 is a block diagram of an exemplary order of storage allocation transactions pursuant to a generated data migration plan.

Turning finally to FIG. 7, a block diagram of an exemplary order of storage allocation transactions pursuant to a generated data migration plan is depicted. FIG. 7 illustrates an exemplary execution order for migrating each of a number of data migrations organized in a transaction group (column 202). Each of the transaction groups corresponds to a logical storage unit (column 204), a logical dataset (column 206), a source device class (column 208), and a destination device class (column 210). Arrow 212 indicates an execution order of the listed data migrations.

As will be appreciated by one of ordinary skill in the art, aspects of the present invention may be embodied as a system, method or computer program product. Accordingly, aspects of the present invention may take the form of an entirely hardware embodiment, an entirely software embodiment (including firmware, resident software, micro-code, etc.) or an embodiment combining software and hardware aspects that may all generally be referred to herein as a "circuit," "module," "process" or "system." Furthermore, aspects of the present invention may take the form of a computer program product embodied in one or more computer readable medium(s) having computer readable program code embodied thereon.

Any combination of one or more computer readable medium(s) may be utilized. The computer readable medium may be a computer readable signal medium or a computer readable storage medium. A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer readable storage medium may be any tangible medium that can contain, or store a program for use by or in connection with an instruction execution system, apparatus, or device.

Program code embodied on a computer readable medium may be transmitted using any appropriate medium, including but not limited to wireless, wired, optical fiber cable, RF, etc., or any suitable combination of the foregoing. Computer program code for carrying out operations for aspects of the present invention may be written in any combination of one or more programming languages, including an object oriented programming language such as Java, Smalltalk, C++ or the like and conventional procedural programming languages, such as the "C" programming language or similar programming languages. The program code may execute entirely on the user's computer, partly on the user's computer, or entirely on the remote computer or server. In the last scenario, the remote computer may be connected to the user's computer through any type of network, including a local area network (LAN) or a wide area network (WAN), or the connection may be made to an external computer (for example, through the Internet using an Internet Service Provider).

Aspects of the present invention are described below with reference to flowchart illustrations and/or block diagrams of methods, apparatus (systems) and computer program products according to embodiments of the invention. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer readable medium that can direct a computer, other programmable data processing apparatus, or other devices to function in a particular manner, such that the instructions stored in the computer readable medium produce an article of manufacture including instructions which implement the function/act specified in the flowchart and/or block diagram block or blocks. The computer program instructions may also be loaded onto a computer, other programmable data processing apparatus, or other devices to cause a series of operational steps to be performed on the computer, other programmable apparatus or other devices to produce a computer implemented process such that the instructions which execute on the computer or other programmable apparatus provide processes for implementing the functions/acts specified in the flowchart and/or block diagram block or blocks.

The flowchart and block diagrams in the above figures illustrate the architecture, functionality, and operation of possible implementations of systems, methods and computer program products according to various embodiments of the present invention. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

While one or more embodiments of the present invention have been illustrated in detail, one of ordinary skill in the art will appreciate that modifications and adaptations to those embodiments may be made without departing from the scope of the present invention as set forth in the following claims.

What is claimed is:

1. A system for matching storage application performance in a multiple tier storage system, comprising: a storage management module operational in the multiple tier storage system, wherein the storage management module is adapted for: monitoring input/output (I/O) activity in the multiple tier storage system to collect statistical information, recurrently transforming the statistical information of the I/O activity using an exponential moving average (EMA) having a predefined smoothing factor to obtain an EMA value, sorting data portions in the multiple tier storage system into buckets of varying temperatures corresponding to the EMA value, and recurrently generating at least one data migration plan for matching the sorted data portions to at least one of an available plurality of storage device classes, wherein one data portion sorted into a higher temperature bucket having higher EMA values is matched with a higher performance storage device class of the available plurality of storage device classes than another data portion sorted into a lower temperature bucket having lower EMA values.

2. The system of claim 1, wherein the storage management module is further adapted for, pursuant to the sorting data portions, sorting extents of the multiple tier storage system into the buckets of varying temperatures corresponding to the EMA value.

3. The system of claim 1, wherein the storage management module is further adapted for repeating the monitoring I/O activity in the multiple tier storage system for each of a plurality of predefined smoothing factors having decreasing values to generate at least a shorter and a longer EMA of the I/O activity.

4. The system of claim 3, wherein the storage management module is further adapted for performing one of:
   pursuant to detecting that the longer EMA of the I/O activity is smaller than the shorter EMA of the I/O activity, adjusting the at least one data migration plan to consider a current up trend change of the I/O activity, and
   pursuant to detecting that the longer EMA is larger than the shorter EMA of the I/O activity, adjusting the at least one data migration plan to consider current down trend change of the I/O activity.

5. The system of claim 1, wherein the storage management module is further adapted for, pursuant to the generating at least one data migration plan, performing at least one of:
   promoting the one data portion sorted into the higher temperature bucket from one or more storage devices in a hard disk drive (HDD) class to one or more storage devices in a solid state drive (SSD) class,
   demoting the another data portion sorted into the lower temperature bucket from the one or more storage devices in the SSD class to the one or more devices in the HDD class, and
   swapping the another data portion sorted into the lower temperature bucket in the one or more storage devices in the SSD class with the one data portion sorted into the higher temperature bucket in the one or more storage devices in the HDD class.

6. The system of claim 1, wherein the storage management module is further adapted for allocating the at least one of the available plurality of storage device classes according to the generated at least one data migration plan, wherein pursuant to allocating the at least one of the available plurality of storage device classes, a data migration bandwidth is throttled so as not to disrupt overall performance of the multiple tier storage system.

7. The system of claim 1, wherein the storage management module is further adapted for, pursuant to the monitoring the I/O activity in the multiple tier storage system to collect the statistical information, collecting at least one of:
   an I/O read count,
   an I/O write count,
   a cumulative latency,
   a cache miss count,
   a total data transferred, and
   an average I/O size.

8. A computer program product for matching storage application performance in a multiple tier storage system, the computer program product comprising a non-transitory computer-readable storage medium having computer-readable program code portions stored therein, the computer-readable program code portions comprising: a first executable portion for monitoring input/output (I/O) activity in the multiple tier storage system to collect statistical information; a second executable portion for recurrently transforming the statistical information of the I/O activity into an exponential moving average (EMA) having a predefined smoothing factor to obtain an EMA value; a third executable portion for sorting data portions in the multiple tier storage system into buckets of varying temperatures corresponding to the EMA value; and a fourth executable portion for recurrently generating at least one data migration plan for matching the sorted data portions to at least one of an available plurality of storage device classes, wherein one data portion sorted into a higher temperature bucket having higher EMA values is matched with a higher performance storage device class of the available plurality of storage device classes than another data portion sorted into a lower temperature bucket having lower EMA values.

9. The computer program product of claim 8, further including a fifth executable portion for, pursuant to the sorting data portions, sorting extents of the multiple tier storage system into the buckets of varying temperatures corresponding to the EMA value.

10. The computer program product of claim 8, further including a fifth executable portion for repeatedly performing the monitoring I/O activity in the multiple tier storage system for each of a plurality of predefined smoothing factors having decreasing values to generate at least a shorter and a longer EMA of the I/O activity.

11. The computer program product of claim 10, further including a sixth executable portion for performing one of:
   pursuant to detecting that the longer EMA of the I/O activity is smaller than the shorter EMA of the I/O activity, adjusting the at least one data migration plan to consider a current up trend change of the I/O activity, and
   pursuant to detecting that the longer EMA is larger than the shorter EMA of the I/O activity, adjusting the at least one data migration plan to consider current down trend change of the I/O activity.

12. The computer program product of claim 8, further including a fifth executable portion for, pursuant to the generating at least one data migration plan, performing at least one of:
   promoting the one data portion sorted into the higher temperature bucket from one or more storage devices in a hard disk drive (HDD) class to one or more storage devices in a solid state drive (SSD) class,
   demoting the another data portion sorted into the lower temperature bucket from the one or more storage devices in the SSD class to the one or more devices in the HDD class, and
   swapping the another data portion sorted into the lower temperature bucket in the one or more storage devices in the SSD class with the one data portion sorted into the higher temperature bucket in the one or more storage devices in the HDD class.

13. The computer program product of claim 8, further including a fifth executable portion for allocating the at least one of the available plurality of storage device classes according to the generated at least one data migration plan, wherein pursuant to the allocating the at least one of the available plurality of storage device classes, a data migration bandwidth is throttled so as not to disrupt overall performance of the multiple tier storage system.

14. The computer program product of claim 8, further including a fifth executable portion for, pursuant to the monitoring the I/O activity in the multiple tier storage system to collect the statistical information, collecting at least one of:
    an I/O read count,
    an I/O write count,
    a cumulative latency,
    a cache miss count,
    a total data transferred, and
    an average I/O size.

\* \* \* \* \*